United States Patent [19]

Rath

[11] 4,119,454
[45] Oct. 10, 1978

[54] SMELTING METHOD
[75] Inventor: Gero Rath, Mülheim, Germany
[73] Assignee: Demag AG, Duisburg, Germany
[21] Appl. No.: 771,840
[22] Filed: Feb. 24, 1977
[30] Foreign Application Priority Data
Feb. 28, 1976 [DE] Fed. Rep. of Germany ....... 2608279
[51] Int. Cl.² .............................................. C22C 5/52
[52] U.S. Cl. ........................................ 75/12; 75/44 S
[58] Field of Search ....................................... 75/10–12
[56] References Cited
U.S. PATENT DOCUMENTS

| 3,067,473 | 12/1962 | Hopkins | 75/10 R |
| 3,234,608 | 2/1966 | Peŕas | 75/10 R |
| 3,469,968 | 9/1969 | Snow | 75/10 R |

Primary Examiner—P. D. Rosenberg
Attorney, Agent, or Firm—Mandeville and Schweitzer

[57] ABSTRACT

An improved method is provided for smelting steel from scrap in an electric arc furnace which reduces energy consumption, reduces operating noise, and improves the product quality in relation to the scrap charged. The method includes maintaining a continuous slag layer in the furnace vessel of a specific thickness and temperature, maintaining the furnace electrodes immersed in the slag layer, pre-heating the charge material to a specific range, and relating the charging speed to the processing speed of the furnace under prevailing operating parameters. By immersing the electrodes in the slag layer and avoiding direct contact thereof with the pre-heated charge material, heat transfer takes place between the electrodes and the slag, causing the slag layer to apply heat directly and continuously to the charge as it passes through the slag layer, thus avoiding violent reactions at the charge-slag interface, avoiding heat loss by radiation and causing continuous decarbonizing, desulfurizing and dephosphorizing of the charge throughout the slag layer.

7 Claims, 1 Drawing Figure

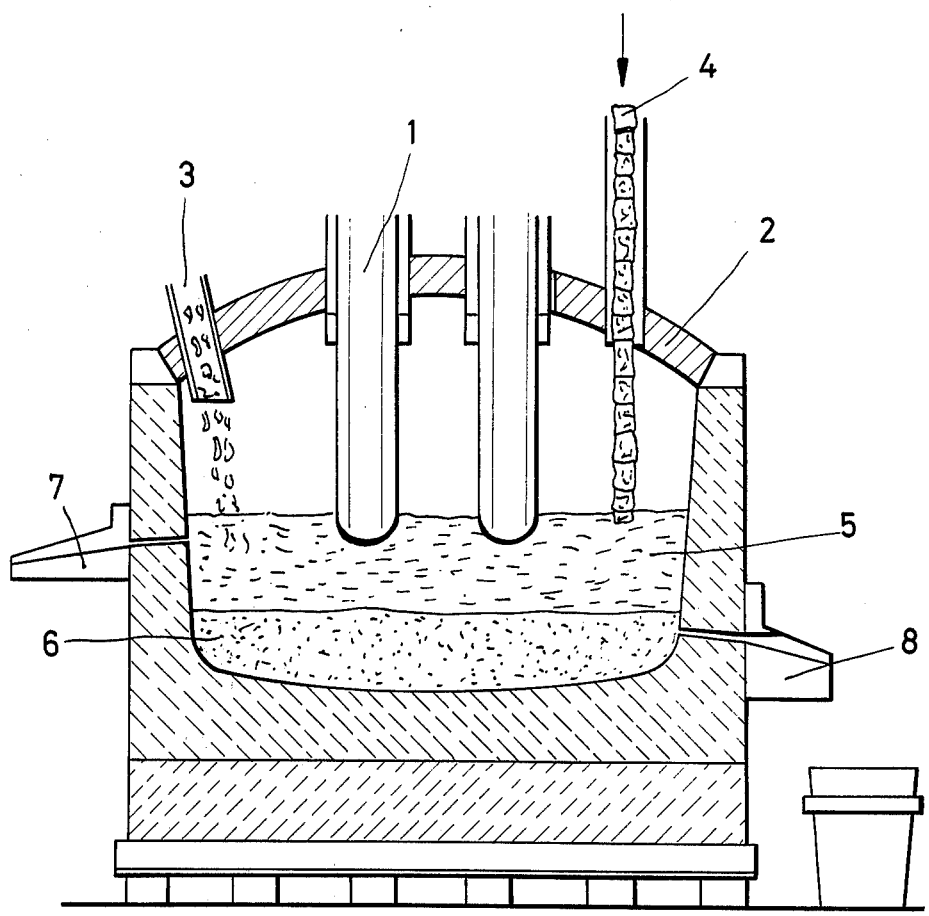

SMELTING METHOD

BACKGROUND AND STATEMENT OF THE INVENTION

Electrothermal smelting of steel from scrap has been reserved mainly for electric arc furnaces for a long time. Other smelting equipment, such as induction furnaces, find their use in the steel industry limited by the special prerequisites of charge materials, as well as by the limitations on practicable slag metallurgy.

The advantages of electric arc furnaces, such as high smelting capacity due to concentration of great quantities of energy, considerable independence from the physical quality of the scrap (however, the latter having an essential influence on energy consumption), as well as the possibility of a controlled slag metallurgy, are accompanied by disadvantages. They are noise pollution, particularly during the smelting period, strong fluctuations in power requirements, particularly during the smelting periods and consequently great demand on the power lines, and high combustion losses due to the direct effect of the arc on the scrap during the smelting period, and on the steel bath during the refining period. This is accompanied by great iron losses due to evaporation, as well as by the accumulation of large quantities of fumes.

Other disadvantages include increased iron losses due to working with slag of relatively high iron content with relatively high specific slag quantity, increased energy losses due to constant working with an arc, which as an unfavorable thermal efficiency factor resulting from radiation losses, and working with relatively great specific slag quantities so that the kinetically unfavorable border area reactions between the steel bath and the slag take place within a reasonable period of time. Still further disadvantages include absorption of nitrogen from the furnace atmosphere by ionization in the arc, and the consequent influence on the bare steel bath at the focal point of the electrodes, utilization of expensive graphite electrodes, and the limitation of furnace capacity resulting from limited diameter of graphite electrodes. Also, there is great wear on the refractory lining material especially caused by radiation heat from the arc, by the additional mechanical and thermal stresses of the charge and tilt operations, as well as by the additional chemical attack on masonry and particularly the cap by the iron contained in the flue gas, burning in the arc and oxydizing in the furnace atmosphere, and the intense heat, especially due to the charge-type feeding of scrap and, during refining periods, operating with partially opened furnace doors.

It is the subject of the invention, while maintaining the advantages of the electric arc furnace to eliminate the disadvantages noted above with respect to pollution of the environment, to improve the specific consumption and operating data, as well as to obtain optimum thermal and metallurgical performance in the entire process. The invention is directed to a method of smelting steel from scrap in an electric arc furnace wherein the disadvantages are eliminated by having the scrap continuously smelted in a bath constantly covered by a layer of slag, whereby heat is supplied by means of electrodes immersed in the slag layer.

DETAILED DESCRIPTION OF THE INVENTION

In principle, the process of the method of the invention to smelt steel from up to 100% scrap in an electric reduction furnace is as follows: electric energy is supplied to the process by electrodes. The number of electrodes for a round furnace is preferably three, while for a rectangular furnace two, four or six electrodes are used. For extremely high capacities in a rectangular furnace, the number may be 4, 8 or 12. The electrodes are immersed in a slag layer covering the metal bath at all times, such layer being independent of the temperature of the scrap charged. The slag, therefore, serves simultaneously as the heating element, whereby the electric energy is transformed to Joule heat by resistance heating and supplied to the process. As a result, the metallurgy of decarbonization, dephosphorization, desulfurization, etc. is in the slag layer. Thus, these reactions take place largely in the slag layer under kinetically favorable conditions, and largely independent of the phase boundary between the slag and the resulting molten metal.

The furnace center is designed so that the iron droplets coming through the slag layer are collected, and the molten metal is tapped, at certain intervals. Suitably, the furnace center is developed so that its capacity for analytical compensation is a recommended 1-10 tap weights, whereby its capacity is based mainly on the scrap quality to be charged. In addition, a substantial influence on the process is exerted by the preheating temperature of the scrap. The higher its temperature, the faster the reaction processes take place.

For optimum reaction conditions and, consequently, for optimum reaction processing, it is important that the scrap can react immediately with the liquid slag, and that these reaction conditions can be maintained continuously. Therefore, the scrap, upon entering the slag, should not be surrounded by a soldifying slag layer which would then first have to melt again before the reaction process can commence. To maintain these optimum reaction conditions of immediate start decarbonization, desulfurization and dephosphorization reactions and their extensive occurrence in the slag, the invention includes charging the scrap preheated to at least 500° C., and preferably, exceeding 700° C. Also, highly reactive and superheated slag is used and maintained at elevated temperatures, preferably at the operating temperature of 40°–100° C. above the steel temperature, and 70°–220° C. above the liquid temperature of the slag. Therefore, overheating above liquid temperature depends almost entirely on the preheating temperature of the slag. Also, a minimum thickness of the slag layer is maintained constantly, by separate tapholes for metal and slag, and preferably within the range of between about 200–800mm, depending upon the preheating temperature and size of the scrap pieces.

A minimum distance is maintained between the area of charging and the electrodes of 0.3 times the electrode diameter in order to avoid too great an increase in electricity conductivity of the slag within the area of direct energy transfer, which would endanger the resistance heating operation.

The feeding operation, in accordance herewith, may include feeding reduced scrap continuously or intermittently through one or more feed openings. Preferably, the feeding is continuous through several feed openings. The minimum distance, as noted above, of the scrap just entering the slag to the electrode is at least 0.3 × the electrode diameter. In cases where the feeding is of welded together or otherwise bulky scrap through the feed openings or feed pipes of the furnace, according to the invention, the pipe diameter must be larger than the greatest diameter of the scrap package. Escape of furnace gas through feed pipes can be prevented by an air or inert gas lock. Preheating of the scrap is largely done in the furnace atmosphere, and is determined by scrap part thickness, and the speed by which it is fed.

One advantage of the continuous smelting operation of the invention is that the resulting hot furnace gas can be directed toward a heat recovery plant, controlled in quantity, temperature and continuity. Next to its use for energy or sanitary purposes, such heat recovery may be applied to scrap preheating for the process itself outside the reduction furnace. The constant heat supply from the process makes it possible to clearly calculate necessary auxiliary heat requirements from oil or gas or other sources.

The utilization of the continuously produced waste heat makes the invention profitable from an energy utilization standpoint as well as a metallurgical standpoint. Another advantage of this method is its compatibility with the environment. The electrodes immersed in the slag, as well as the type of energy transfer by resistance heating, do not cause any noise pollution, as would an arc furnace operation during charging of scrap. Continuous energy supply and constant resistance conditions in the slag also guarantee constant and even energy intake. Fluctuations do not appear. Relatively low-current electric cables will suffice.

Another advantage of this method is the fact that combustion losses are largely avoided, specifically by the manner of energy intake, by the slag layer converting the metal bath, and by the energy distribution in the slag itself. Also, only small additional slag quantities are required which amount to about 3-30 kilograms per ton of finished steel, depending on the type of process, scrap quality and desired finished product. Basically, only the losses through evaporation, and materials consumed by metallurgical reactions must be replaced. It is also advantageous for the method of the invention that nitrogen absorption from the furnace atmosphere is avoided by eliminating the arc, as well as by the constant cover of slag on the molten steel bath.

Another advantage is the longer life of the refractory material. Uniform temperature conditions, elimination of radiation heat from the arc, omission of tilting operations, as well as prevention of a furnace atmosphere rich in iron oxide contribute to life spans of the refractory masonry of 1 year or more. In order to prevent chemical wear of the refractory material in the area of increased slag layer, as well as the border area between metal and slag, the furnace vessel is cooled with water on the outside, which leads to a hardening of the slag adjacent the masonry so that the slag itself is practically functioning as the masonry in this area.

Another important advantage of this method is that the process can be operated with carbon electrodes, such as inexpensive Soderberg electrodes. Especially with the use of Soderberg electrodes the construction of large furnaces is possible, as at the present technical stage Soderberg electrodes of up to 2 meters in diameter have been tested in practice, while graphite electrodes, as those used for arc furnaces, have presently a limit of 0.7 meters in diameter. In accordance herewith, the slag composition used for the process depends on the charge material and the quality of steel to be produced. Corrections that may be necessary on short notice, can be made of means of hollow electrodes.

A new method of operation in electro metallurgy in which a partial performance of metallurgic operations is carried out outside the smelting aggregate in the tap ladle or a subsequent auxiliary aggregate, in order to increase the capacity of a smelting installation, comes in very handy for this new method.

DESCRIPTION OF THE DRAWING

An apparatus for carrying out the method of the invention is schematically illustrated in the drawing.

DETAILED DESCRIPTION OF A PREFERRED EMBODIMENT

A stationary electric arc reduction furnace is heated by means of electrodes 1, preferably pre-annealed carbon electrodes, such as Soderberg electrodes. 2 is the furnace cap which accommodates at 3 a device for continuous feeding of reduced scrap. At 4, a charge or feed device is provided, by means of which scrap quantities which are connected, by welding, for example, are supplied. Within the furnace, a thick slag layer 5 is maintained constantly covering the metal bath 6, with the electrodes being immersed in the slag layer 5. Slag tapping is done at 7. The metal tap 8 is provided below tap 7 at the distance of the desired minimum height of the slag layer.

I claim:
1. A method for melting steel scrap in the vessel of an electric arc furnace, comprising the steps of
    (a) maintaining the furnace vessel stationary; the improvement characterized by the steps of
    (b) continuously preheating scrap to be charged to said vessel;
    (c) said preheating step being carried out at a temperature of within the range of between about 500° C. and 700° C. or above;
    (d) continuously charging said preheated scrap material to said vessel;
    (e) continuously maintaining a slag layer covering the bath in said vessel, at a thickness within the range of between about 200 and 800 millimeters;
    (f) supplying heat for melting in said vessel by a plurality of non-consumable electrodes immersed in said slag layer; and
    (g) continuously withdrawing product from said vessel.
2. The method of claim 1, further characterized by
    (a) said continuously maintained slag layer is maintained at a temperature within the range of between about 70° C. and 220° C. above the temperature of the liquid component of said slag layer, and within the range of between about 40° C. and 100° C. above the steel tapping temperature of said vessel.
3. The method of claim 1, further characterized by
    (a) said charging step is carried out by supplying said scrap to the bath in said vessel at a point spaced from said electrodes at least 0.3 times the diameter of said electrodes.
4. The method of claim 1, further characterized by
    (a) said charging step being carried out with bundles of connected-together-scrap.
5. The method of claim 1, further characterized by
    (a) said charging step is carried out at a speed in direct relation to the speed of smelting in said vessel.

6. The method of claim 1, further characterized by
 (a) said continuously maintained slag layer is formed by synthetic slag material.
7. The method of claim 1, further characterized by
 (a) said continuously maintained slag layer includes decarbonizing, desulfurizing and dephosphorizing components.

* * * * *